（12）United States Patent
Shen et al.

(10) Patent No.: US 11,897,162 B2
(45) Date of Patent: Feb. 13, 2024

(54) PIEZORESISTIVE SENSOR MATERIAL AND PREPARATION METHOD AND USE THEREOF

(71) Applicant: Zhejiang A&F University, Hangzhou (CN)

(72) Inventors: Xiaoping Shen, Hangzhou (CN); Qingfeng Sun, Hangzhou (CN); Kangchen Nie, Hangzhou (CN); Li Zheng, Hangzhou (CN)

(73) Assignee: ZHEJIANG A & FUNIVERSITY, Hangzhou (CN)

( * ) Notice: Subject to any disclaimer, the term of this patent is extended or adjusted under 35 U.S.C. 154(b) by 645 days.

(21) Appl. No.: 17/094,685

(22) Filed: Nov. 10, 2020

(65) Prior Publication Data

US 2021/0143321 A1    May 13, 2021

(30) Foreign Application Priority Data

Nov. 11, 2019    (CN) .......................... 201911092178.2

(51) Int. Cl.
*B27N 3/02*    (2006.01)
*B27K 3/02*    (2006.01)
(Continued)

(52) U.S. Cl.
CPC .............. *B27N 3/02* (2013.01); *B27K 3/0207* (2013.01); *B27K 3/15* (2013.01); *B27K 3/16* (2013.01);
(Continued)

(58) Field of Classification Search
CPC ... B27N 3/02; B27N 3/04; B27N 3/18; B27N 5/00; B27K 3/0207; B27K 3/15;
(Continued)

(56) References Cited

U.S. PATENT DOCUMENTS 10,836,880 B2 *  11/2020  Yang ........................ C08J 5/046
2006/0213275 A1   9/2006   Cobianu et al.

FOREIGN PATENT DOCUMENTS

CN    102313818    1/2012
CN    102443188    5/2012
(Continued)

OTHER PUBLICATIONS

Lu Shaoyi et al.: "Research Progress of Nano-cellulose-based Conductive Composite Materials", "Forestry Science".
(Continued)

*Primary Examiner* — Emily P Pham
(74) *Attorney, Agent, or Firm* — Weide & Miller, Ltd.

(57) ABSTRACT

The present disclosure provides a method for preparing a piezoresistive sensor material, including: preparing a wood fiber aerogel; conducting dopamine self-polymerization on the surface of the aerogel to obtain a wood fiber-based hydrogel; soaking the wood fiber-based hydrogel in a nano conductive phase suspension or a nano conductive phase precursor to form a conductive phase-loaded wood fiber-based hydrogel; subjecting the conductive phase-loaded wood fiber-based hydrogel to reaction with an aqueous solution including a polyelectrolyte monomer, a crosslinker, an initiator and a catalyst to form a conductive phase-wood fiber-based hydrogel composite; and complexing the composite with metal ions. The present disclosure further discloses a piezoresistive sensor including the sensor material, and a preparation method thereof. The sensor material prepared by the method of the present disclosure has excellent mechanical strength and ionic conductivity, and a sensor further prepared has extremely-high sensitivity.

20 Claims, 4 Drawing Sheets

(51) Int. Cl.
 B27K 3/15 (2006.01)
 B27K 3/16 (2006.01)
 B27N 3/18 (2006.01)
 B01J 13/00 (2006.01)
(52) U.S. Cl.
 CPC ............. *B27N 3/18* (2013.01); *B01J 13/0065* (2013.01); *B01J 13/0091* (2013.01); *B27K 2200/10* (2013.01); *B27K 2240/00* (2013.01)
(58) Field of Classification Search
 CPC ........ B27K 3/16; B27K 3/18; B27K 2200/10; B27K 2240/00; B01J 13/0065; B01J 13/0091; B01J 13/0052; G01L 1/18; C08K 3/042; C08K 2003/0806; C08K 2201/001; C08K 2201/011; C08J 9/40; C08J 9/26; C08J 9/405; C08J 2397/02; C08J 2433/02
 See application file for complete search history.

(56) References Cited

FOREIGN PATENT DOCUMENTS

| CN | 102702566 | 10/2012 |
| CN | 104130540 | 11/2014 |
| CN | 105387927 | 3/2016 |
| CN | 105860098 | 8/2016 |
| CN | 107063520 | 8/2017 |
| CN | 108440772 | 8/2018 |
| CN | 108567565 | 9/2018 |
| CN | 108760101 | 11/2018 |
| CN | 108801535 | 11/2018 |
| CN | 109528167 | 3/2019 |
| CN | 109853228 | 6/2019 |
| CN | 109916527 | 6/2019 |
| CN | 110057474 | 7/2019 |
| CN | 110078866 | 8/2019 |
| CN | 110108393 | 8/2019 |
| CN | 110124113 | 8/2019 |
| KR | 20180085853 | 7/2018 |

OTHER PUBLICATIONS

Tang Qunwei, etc.: "Preparation of New Type Polyacrylamide/Carbon Fiber/Graphite Conductive Hydrogel", "Functional Materials".

Han Jingquan et al.: "Synthesis and Characterization of Cellulose Nanofibrils Reinforced Conductive Hydrogel", Journal of Forestry Engineering.

* cited by examiner

PIEZORESISTIVE SENSOR MATERIAL AND PREPARATION METHOD AND USE THEREOF

RELATED APPLICATION DATA

The present application claims priority to China Patent Application No. 201911092178.2, filed Nov. 11, 2019.

FIELD OF THE INVENTION

The present disclosure belongs to the field of preparation of sensor materials, and in particular relates to a piezoresistive sensor material, and a preparation method and use thereof.

BACKGROUND OF THE INVENTION

Flexible piezoresistive sensors can help for identifying environmental features or stimulation. Therefore, they can be used as an important component in wearable smart devices, artificial muscles, electronic skin, and medical diagnosis in the field of human-computer interaction (HCI). The fundamental mechanism of the piezoresistive effect lies in that the conductive network or energy band structure of a material changes under the action of external stress, so that the resistivity of the material changes. The three-dimensional (3D) conductive network system is a common piezoresistive material. A continuous conductive network is formed by filling a conductive phase in a flexible elastomer, and the conductive network will be reconstructed when deformation occurs, so that the resistivity of a composite material changes, thereby achieving the force-sensitive effect.

The polyelectrolyte hydrogel is an excellent 3D ion-conductive network, which has disadvantages such as low conductivity and poor force-sensitivity. Nano silver, graphene, and the like are new one-dimensional (1D) and 2D nanomaterials with high conductivity, which have the advantages of strong conductivity, prominent force-sensitivity, and high compressive strength. These nanomaterials can also be used as basic materials for preparing flexible piezoresistive sensors. Therefore, how to combine the two to prepare a material with strong conductivity and high mechanical strength is an urgent problem to be solved in the art.

SUMMARY OF THE INVENTION

To solve the above-mentioned technical problem, in a first aspect, the present disclosure provides a method for preparing a piezoresistive sensor material, including the following steps:

S1: treating a wood powder with an ionic liquid (IL), and subjecting a resulting wood powder to solation, chemical crosslinking-gelation, and lyophilization to obtain a wood fiber aerogel;

S2: soaking the aerogel in an alkaline buffer of dopamine hydrochloride to conduct self-polymerization on the surface of the aerogel for 10 h to 14 h to obtain a wood fiber-based hydrogel deposited with polydopamine;

S3: soaking the wood fiber-based hydrogel in a nano conductive phase suspension or a nano conductive phase precursor for 10 h to 24 h, and compressing the liquid in the wood fiber-based hydrogel; and repeating the above operations 3 to 5 times to form a conductive phase-loaded wood fiber-based hydrogel;

S4: subjecting the conductive phase-loaded wood fiber-based hydrogel to reaction with an aqueous solution including a polyelectrolyte monomer, a crosslinker, an initiator and a catalyst at 40° C. to 60° C. for 12 h to 24 h to form a conductive phase-wood fiber-based hydrogel composite; and S5: soaking the conductive phase-wood fiber-based hydrogel composite in an aqueous solution of a metal ionic compound for 6 h to 24 h of complexation to form the piezoresistive sensor material.

Further, in the step S1, the wood powder may be a powder of poplar, pine, fir or balsa wood; and preferably, the wood powder may have a particle size of 60 mesh to 100 mesh.

Further, the step S1 may include:

S11: adding the wood powder to an IL of 1-ethyl-3-methylimidazolium acetate ([EMIM][Ac]) at an amount that is 4% to 6% of the mass fraction of the IL, and heating and stirring a resulting mixture at 110° C. to 185° C. for 30 min to 24 h to form a suspension; transferring the above suspension into an acetone aqueous solution with a volume 8 to 10 times that of the suspension and a concentration of 40% to 60% (v/v), and stirring a resulting mixture for 1 h to 3 h; subjecting the mixture to suction filtration to obtain a filter cake; and washing the filter cake, and drying the filter cake at 100° C. to 110° C. to obtain a wood fiber;

S12: adding the wood fiber to an aqueous solution including 4 wt % NaOH and 4 wt % urea to form a suspension; freezing the suspension at −40° C. to −20° C. for 3 h to 9 h and thawing at room temperature; and repeating the above freezing and thawing treatment 3 to 5 times to obtain a sol-gelled wood fiber; where, the wood fiber and the aqueous solution are mixed at a mass ratio of (0.8-1.5):100;

S13: adding epichlorohydrin (ECH) to the sol-gelled wood fiber at a mass 8 to 20 times that of the sol-gelled wood fiber; heating and reacting at 40° C. to 60° C. for 1 h to 6 h; and washing with water to obtain a chemical crosslinking-gelled wood fiber; and S14: adding 100 mL to 500 mL of a 30% to 90% (v/v) ethanol aqueous solution to the chemical crosslinking-gelled wood fiber, standing for 10 h to 16 h, washing with water, and lyophilizing to obtain a wood fiber aerogel with a density of 0.016 g cm$^{-3}$ to 0.025 g cm$^{-3}$.

Further, the step S2 may include: soaking the aerogel in an alkaline tris-hydroxymethylaminomethane-hydrochloric acid buffer of dopamine hydrochloride to obtain the wood fiber-based hydrogel deposited with polydopamine; and preferably, the buffer has a dopamine hydrochloride concentration of 1 mg/mL to 3 mg/mL, a tris-hydroxymethylaminomethane concentration of 0.01 mol/L to 0.1 mol/L, and a pH of 8 to 10.5.

Further, in the step S3, the nano conductive phase suspension may be a reduced graphene oxide (rGO) suspension; and preferably, the rGO suspension may be prepared by the following steps:

S31: adding 2 g of graphite powder to 45 mL of concentrated sulfuric acid with a mass fraction of 98% under a 0° C. ice water bath and mechanical stirring, and adding 10 g of potassium permanganate at a rate of about 0.5 g/min to form a suspension;

S32: transferring the above suspension to a 35° C. water bath, and stirring vigorously for 24 h; heating to 90° C., and adding 250 mL of deionized water; stirring a resulting mixture vigorously for 30 min, and cooling to room temperature; adding 10 mL of a 30% (v/v) H2O2 aqueous solution, and thoroughly stirring a resulting mixture; centrifuging the resulting mixture at 10,000 rpm for 15 min, and removing a resulting supernatant; and washing a resulting precipitate with deionized water, and repeating the above centrifuging and washing operations 5 times to obtain a graphene oxide (GO) concentrate;

S33: diluting a portion of the GO concentrate to 20 mL with a concentration of 5 mg/mL, and adding 20 mL of 55% (v/v) HI aqueous solution; conducting reduction at room temperature for 6 h; and conducting dialysis for one week to obtain an rGO suspension precursor; and S34: adjusting the concentration of rGO to 0.05 mg/mL, 0.1 mg/mL and 0.2 mg/mL, separately, and subjecting resulting solutions to ultrasonication for 15 min to obtain rGO suspensions with three different concentrations.

Further, in the step S3, the nano conductive phase precursor may be a 25 mmol/L to 100 mmol/L silver nitrate aqueous solution.

Further, in the step S4, the polyelectrolyte monomer may be a 2.8 mol/L to 3.5 mol/L acrylic acid aqueous solution; the crosslinker may be N,N'-methylenebisacrylamide (MBAA), which is added at an amount that is 0.1% to 0.5% of the mass fraction of the polyelectrolyte monomer; the catalyst may be tetramethylethylenediamine (TMEDA), which is added at an amount that is 0.05% to 0.15% of the volume fraction of the aqueous solution; and the initiator may be a persulfate, and preferably ammonium persulfate (APS), which is added at an amount that is 0.5% to 1.5% of the mass fraction of the polyelectrolyte monomer.

Further, in the step S5, the metal ion aqueous solution may be a $AlCl_3$ or $FeCl_3$ aqueous solution with a concentration of 0.2 mol/L to 1.0 mol/L.

In a second aspect, the present disclosure provides use of any one of the piezoresistive sensor materials described above in the preparation of a piezoresistive sensor.

In a third aspect, the present disclosure also provides a piezoresistive sensor, which is prepared by the following steps:

S1: cutting any one of the piezoresistive sensor materials described above into a suitable size to obtain a hydrogel dielectric layer, which is preferably a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

S2: preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and S3: encapsulating the sandwich structure with lead wires using polyimide film tape to obtain the piezoresistive sensor.

Further optionally, the electrode in S2 may be a copper or foamed nickel electrode; and preferably, the foamed nickel or copper electrode may have a thickness of 50 μm to 100 μm.

Further, the polyimide film tape in S3 may have a thickness of 40 μm.

Beneficial Effects:

The present disclosure has the following beneficial effects:

1. In the present disclosure, a wood powder is treated with an IL and subjected to solation, chemical crosslinking-gelation, and lyophilization, and lignin and hemicellulose in the wood powder are removed to obtain a wood fiber aerogel. The obtained wood fiber aerogel has a large number of pore structures that are arranged regularly and uniformly and have intact pore walls (as shown in FIGS. 1A-1C).

2. The present disclosure can not only use the loading of polydopamine and rGO, but also reduce silver nitrate to produce nano silver particles, so as to ingeniously and low-costly introduce nano silver, graphene and other nanomaterials into the structure, thereby imparting prominent conductivity to the hydrogel.

3. The nano conductive phase-coated wood fiber-polyelectrolyte composite hydrogel prepared by the present disclosure has excellent cyclic compression performance; and the loading of metal ions and carboxyls in polyacrylic acid (PAA) greatly improves the mechanical strength of the composite hydrogel.

4. A sensor prepared using the piezoresistive sensor material prepared in the present disclosure has an extremely-high sensitivity and an extremely-wide sensing range.

DESCRIPTION OF THE DRAWINGS

FIG. 1A shows an electron micrograph for a double-crosslinked wood fiber hydrogel; FIG. 1B shows an electron micrograph for a 2D carbon nanomaterial of rGO loaded; and FIG. 1C shows an electron micrograph for silver nanoparticles loaded. It can be seen from the figure that the wood fiber aerogel (abbreviated as CRM aerogel) has plenty of regular pore structures, which ensures the subsequent composite with a polyelectrolyte hydrogel; after the CRM aerogel is loaded with a conductive nanophase, the conductive nanophase covers the pore wall layer of the CRM aerogel; and the rGO is in the form of flakes, and the silver nanoparticles are in the form of particles.

FIG. 1A shows the cyclic compression performance of rGO-coated wood fiber/polyelectrolyte hydrogel, and curves in the figure represent: from top to bottom, rGO-loaded wood fiber/polyelectrolyte composite hydrogel (i.e., CRM-pDA-rGO/PAAC3.5, with a PAAc concentration of 3.5 mol/L), wood fiber composite hydrogel without any conductive nanophase (i.e., CRM/PAAC3.5, with a PAAc concentration of 3.5 mol/L), and PAA hydrogel (i.e., PAAc3.5, with a PAAc concentration of 3.5 mol/L), respectively; and FIG. 2B shows the cyclic compression performance of nano silver particles-coated wood fiber/polyelectrolyte hydrogels, and curves in the figure represent: from top to bottom, silver nanoparticles loaded wood fiber/polyelectrolyte composite hydrogels with PAAc concentrations of 3.5 mol/L, 3.2 mol/L, and 2.8 mol/L, (i.e., CRM-pDA-Ag/PAAC3.5, CRM-pDA-Ag/PAAC3.2, and CRM-pDA-Ag/PAAC2.8), respectively.

It can be seen from the figure that 1) the loading of conductive nanophase greatly improves the mechanical strength of the composite hydrogel; 2) under the same polyelectrolyte concentration, the loading of rGO exhibits a slightly-stronger effect in improving the mechanical properties of the composite hydrogel than the loading of silver nanoparticles; 3) the greater the concentration of polyelectrolyte, the greater the strength of the composite hydrogel; and 4) except for the great energy dissipation during the first two compression-rebounding processes, excellent repeatability shows during the subsequent cyclic compression, indicating that the composite hydrogel has prominent resiliency.

Figure 1A:
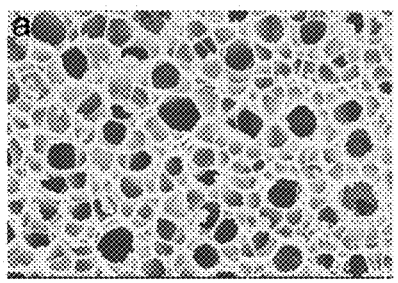
FIGS. 1A-1C shows electron micrographs for the compressible wood fiber hydrogel prepared in Embodiment 3, where
Figure 1B:
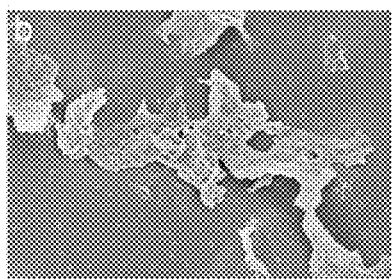
Figure 1C:
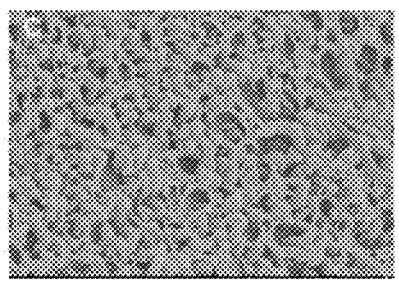
Figures 2A, 2B:
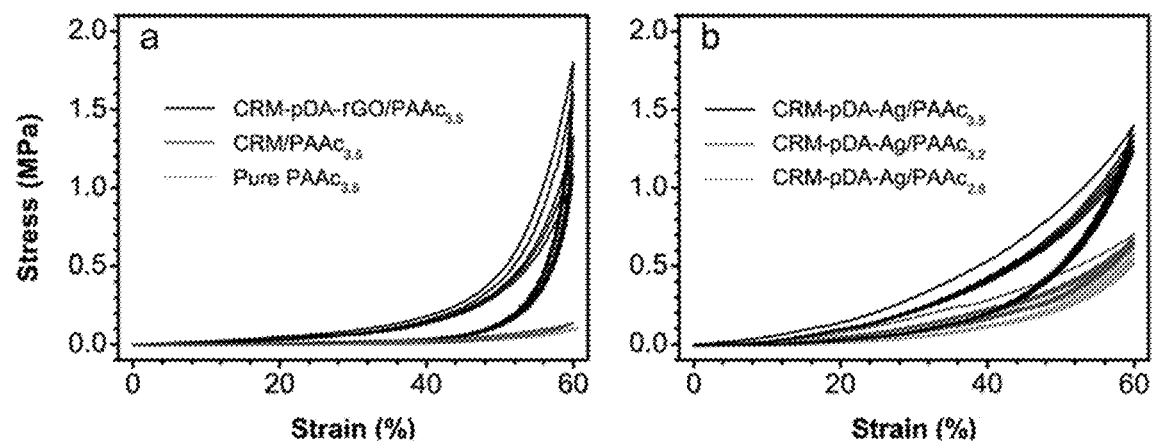
FIGS. 2A and 2B shows the cyclic compression performance of sensor materials: nano conductive phase-coated wood fiber/polyelectrolyte composite hydrogel, where
Figures 3A, 3B:
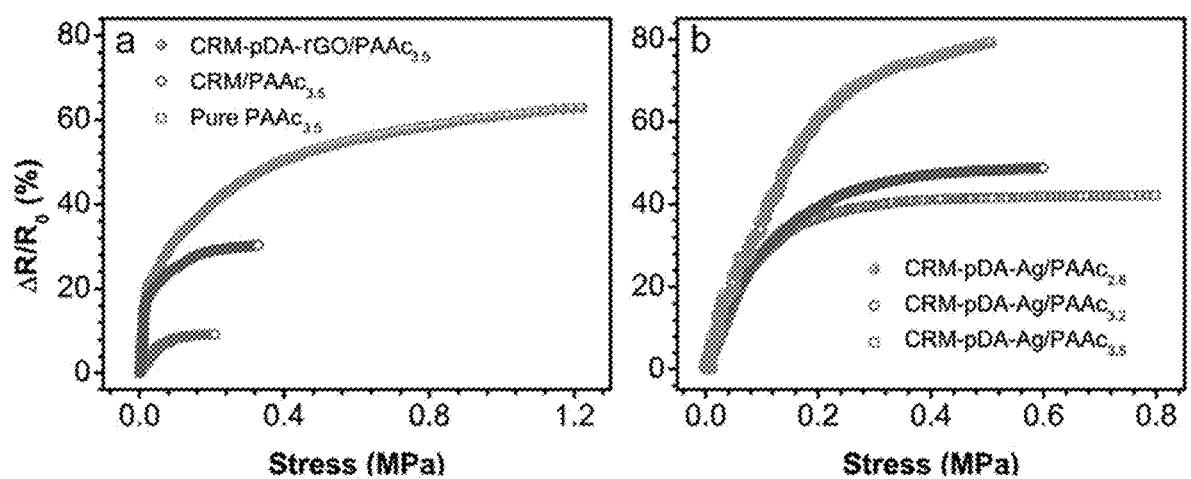

FIGS. 3A and 3B shows the sensitivity of the sensor materials prepared in Embodiments 1 and 3, where FIG. 3A shows the sensitivity of rGO-coated wood fiber/polyelectrolyte hydrogel; and FIG. 3B shows the sensitivity of silver nanoparticles-coated wood fiber/polyelectrolyte hydrogel. It can be seen from the figure that the introduction of the porous CRM aerogel greatly improves the mechanical sensitivity of the polyelectrolyte hydrogel, while the introduction of the conductive nanophase mainly increases the stress-measuring range of the force-sensitive sensor. The two conductive nanophase-loaded composite hydrogels have sensitivities of the same order of magnitude. In addition, the increase in polyelectrolyte concentration has a negative effect on sensitivity.

Figures 4A, 4B:
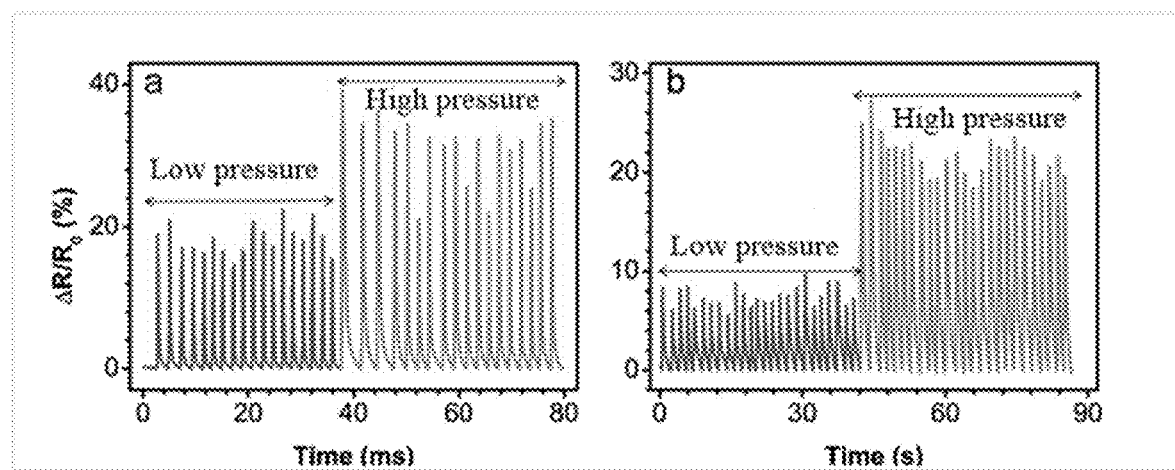

FIGS. 4A and 4B shows signals of the piezoresistive sensors prepared in Embodiment 6 and Embodiment 7 during a press detection test, where FIG. 4A represents the rGO-loaded wood fiber/polyelectrolyte composite hydrogel (CRM-pDA-rGO/PAAc3.5, with a PAAc concentration of 3.5 mol/L); and FIG. 4B represents silver nanoparticles-loaded wood fiber/polyelectrolyte composite hydrogel (CRM-pDA-Ag/PAAc2.8, with a PAAc concentration of 2.8 mol/L). It can be seen from the figure that, for example, in FIG. 4a, the low pressure is about 2 N and the high pressure is about 15 N; in FIG. 4b, the low pressure is about 2 N and the high pressure is about 8 N; and as the pressure increases (0.5 MPa is the optimum within the stress range), the resistance change rate is significantly increased, indicating that the prepared piezoresistive sensor materials, namely, the two conductive nanophase-loaded composite hydrogel sensors, can sensitively sense a stress in real time.

DETAILED DESCRIPTION OF THE INVENTION

The embodiments of the technical solutions of the present disclosure will be described in detail below. The following embodiments are only used to more clearly illustrate the technical solutions of the present disclosure. Therefore, these embodiments are merely exemplary, and cannot be used to limit the protection scope of the present disclosure. It should be noted that the technical terms or scientific terms used herein should have the ordinary meanings as understood by those skilled in the art to which the present disclosure belongs, unless otherwise stated.

Embodiment 1

A method for preparing a piezoresistive sensor material included the following steps:

S1: A poplar powder with a particle size of 60 mesh was treated with an IL, and subjected to solation, chemical crosslinking-gelation, and lyophilization to obtain a wood fiber aerogel. The specific operations were as follows: S11: The wood powder was added to an IL of [EMIM][Ac] at an amount that was 4% of the mass fraction of the IL, and a resulting mixture was heated and stirred at 110° C. for 24 h to form a suspension; the above suspension was transferred into an acetone aqueous solution with a volume 8 times that of the suspension and a concentration of 40% (v/v), and a resulting mixture was stirred for 1 h; the mixture was subjected to suction filtration to obtain a filter cake; and the filter cake was washed and dried at 100° C. to obtain a wood fiber. S12: The wood fiber was added to an aqueous solution including 4 wt % NaOH and 4 wt % urea to form a suspension; the suspension was frozen at −40° C. for 9 h and thawed at room temperature; and the above freezing and thawing treatment was repeated 3 times to obtain a solated wood fiber; where, the wood fiber and the aqueous solution were mixed at a mass ratio of 0.8:100. S13: ECH was added to the solated wood fiber at a mass 8 times that of the solated wood fiber; and a resulting mixture was heated and reacted at 40° C. for 6 h, and washed with water to obtain a chemical crosslinking-gelled wood fiber. S14: 100 mL of a 90% (v/v) ethanol aqueous solution was added to the chemical crosslinking-gelled wood fiber, and a resulting mixture stood for 10 h, and was washed with water and lyophilized to obtain a wood fiber aerogel with a density of 0.018 g cm$^{-3}$.

S2: The wood fiber aerogel was soaked in an alkaline tris-hydroxymethylaminomethane-hydrochloric acid buffer of dopamine hydrochloride for 10 h of self-polymerization on the surface of the aerogel to obtain a wood fiber-based hydrogel deposited with polydopamine, where, the buffer had a dopamine hydrochloride concentration of 1 mg/mL, a tris-hydroxymethylaminomethane concentration of 0.01 mol/L, and a pH of 8.

S3: The wood fiber-based hydrogel deposited with polydopamine was soaked in an rGO suspension for 10 h, and the liquid in the wood fiber-based hydrogel was compressed; and the above operations were repeated 3 times to form a conductive phase-loaded wood fiber-based hydrogel. The rGO suspension was prepared by the following steps: S31: 2 g of graphite powder was added to 45 mL of concentrated sulfuric acid with a mass fraction of 98% under a 0° C. ice water bath and mechanical stirring, and 10 g of potassium permanganate was added at a rate of about 0.5 g/min to form a suspension. S32: The above suspension was transferred to a 35° C. water bath, stirred vigorously for 24 h, and heated to 90° C.; 250 mL of deionized water was added, and a resulting mixture was stirred vigorously for 30 min and cooled to room temperature; 10 mL of a 30% (v/v) H2O2 aqueous solution was added, and a resulting mixture was thoroughly stirred and centrifuged at 10,000 rpm for 15 min; a resulting supernatant was removed, and a resulting precipitate was washed with deionized water; and the above centrifuging and washing operations were repeated 5 times to obtain a GO concentrate. S33: A portion of the GO concentrate was diluted to 20 mL with a concentration of 5 mg/mL, and 20 mL of 55% (v/v) HI aqueous solution was added; reduction was conducted at room temperature for 6 h; and dialysis was conducted for one week to obtain an rGO suspension precursor. S34: The concentration of rGO was adjusted to 0.2 mg/mL, and a resulting solution was subjected to ultrasonication for 15 min to obtain an rGO suspension.

S4: The conductive phase-loaded wood fiber-based hydrogel reacted with an aqueous solution including a polyelectrolyte monomer, a crosslinker, an initiator and a catalyst at 40° C. for 24 h to form a conductive phase-wood fiber-based hydrogel composite. The polyelectrolyte monomer was a 3.5 mol/L acrylic acid aqueous solution; the crosslinker was MBAA, which was added at an amount that was 0.1% of the mass fraction of the polyelectrolyte monomer; the catalyst was TMEDA, which was added at an amount that was 0.05% of the volume fraction of the aqueous solution; and the initiator was APS, which was added at an amount that was 0.5% of the mass fraction of the polyelectrolyte monomer.

S5: The conductive phase-wood fiber-based hydrogel composite was soaked in a AlCl$_3$ aqueous solution with a concentration of 1 mol/L for 24 h of complexation to form the piezoresistive sensor material.

Embodiment 2

A method for preparing a piezoresistive sensor material included the following steps:

S1: A balsa powder with a particle size of 100 mesh was treated with an IL, and subjected to solation, chemical crosslinking-gelation, and lyophilization to obtain a wood fiber aerogel. The specific operations were as follows: S11: The wood powder was added to an IL of [EMIM][Ac] at an amount that was 6% of the mass fraction of the IL, and a resulting mixture was heated and stirred at 185° C. for 30 min to form a suspension; the above suspension was transferred into an acetone aqueous solution with a volume 10 times that of the suspension and a concentration of 60% (v/v), and a resulting mixture was stirred for 3 h; the mixture was subjected to suction filtration to obtain a filter cake; and the filter cake was washed and dried at 110° C. to obtain a wood fiber. S12: The wood fiber was added to an aqueous solution including 4 wt % NaOH and 4 wt % urea to form a suspension; the suspension was frozen at −20° C. for 9 h and thawed at room temperature; and the above freezing and thawing treatment was repeated 5 times to obtain a solated wood fiber; where, the wood fiber and the aqueous solution were mixed at a mass ratio of 1.5:100. S13: ECH was added to the solated wood fiber at a mass 20 times that of the solated wood fiber; and a resulting mixture was heated and reacted at 60° C. for 1 h, and washed with water to obtain a chemical crosslinking-gelled wood fiber. S14: 500 mL of a 30% (v/v) ethanol aqueous solution was added to the chemical crosslinking-gelled wood fiber, and a resulting mixture stood for 10 h, and was washed with water and lyophilized to obtain a wood fiber aerogel with a density of 0.025 g cm$^{-3}$.

S2: The wood fiber aerogel was soaked in an alkaline tris-hydroxymethylaminomethane-hydrochloric acid buffer of dopamine hydrochloride for 14 h of self-polymerization on the surface of the aerogel to obtain a wood fiber-based hydrogel deposited with polydopamine, where, the buffer had a dopamine hydrochloride concentration of 3 mg/mL, a tris-hydroxymethylaminomethane concentration of 0.1 mol/L, and a pH of 10.5.

S3: The wood fiber-based hydrogel was soaked in a 50 mmol/L silver nitrate aqueous solution for 10 h, and the liquid in the wood fiber-based hydrogel was compressed; and the above operations were repeated 5 times to form a conductive phase-loaded wood fiber-based hydrogel.

S4: The conductive phase-loaded wood fiber-based hydrogel reacted with an aqueous solution including a polyelectrolyte monomer, a crosslinker, an initiator and a catalyst at 60° C. for 12 h to form a conductive phase-wood fiber-based hydrogel composite. The polyelectrolyte monomer was a 2.8 mol/L acrylic acid aqueous solution; the crosslinker was MBAA, which was added at an amount that was 0.5% of the mass fraction of the polyelectrolyte monomer; the catalyst was TMEDA, which was added at an amount that was 0.15% of the volume fraction of the aqueous solution; and the initiator was APS, which was added at an amount that was 1.5% of the mass fraction of the polyelectrolyte monomer.

S5: The conductive phase-wood fiber-based hydrogel composite was soaked in a AlCl$_3$ aqueous solution with a concentration of 1.0 mol/L for 6 h of complexation to form the piezoresistive sensor material.

Embodiment 3

A method for preparing a piezoresistive sensor material included the following steps:

S1: A poplar powder with a particle size of 80 mesh was treated with an IL, and subjected to solation, chemical crosslinking-gelation, and lyophilization to obtain a wood fiber aerogel. The specific operations were as follows: S11: The wood powder was added to an IL of [EMIM][Ac] at an amount that was 5% of the mass fraction of the IL, and a resulting mixture was heated and stirred at 147.5° C. for 9 h to form a suspension; the above suspension was transferred into an acetone aqueous solution with a volume 9 times that of the suspension and a concentration of 50% (v/v), and a resulting mixture was stirred for 2 h; the mixture was subjected to suction filtration to obtain a filter cake; and the filter cake was washed and dried at 105° C. to obtain a wood fiber. S12: The wood fiber was added to an aqueous solution including 4 wt % NaOH and 4 wt % urea to form a suspension; the suspension was frozen at −30° C. for 9 h and thawed at room temperature; and the above freezing and thawing treatment was repeated 4 times to obtain a solated wood fiber; where, the wood fiber and the aqueous solution were mixed at a mass ratio of 1.0:100. S13: ECH was added to the solated wood fiber at a mass 14 times that of the solated wood fiber; and a resulting mixture was heated and reacted at 50° C. for 3.5 h, and washed with water to obtain a chemical crosslinking-gelled wood fiber. S14: 300 mL of a 75% (v/v) ethanol aqueous solution was added to the chemical crosslinking-gelled wood fiber, and a resulting mixture stood for 12.5 h, and was washed with water and lyophilized to obtain a wood fiber aerogel with a density of 0.02 g cm$^{-3}$.

S2: The wood fiber aerogel was soaked in an alkaline tris-hydroxymethylaminomethane-hydrochloric acid buffer of dopamine hydrochloride for 12 h of self-polymerization on the surface of the aerogel to obtain a wood fiber-based hydrogel deposited with polydopamine, where, the buffer had a dopamine hydrochloride concentration of 3 mg/mL, a tris-hydroxymethylaminomethane concentration of 0.1 mol/L, and a pH of 8.5.

S3: The wood fiber-based hydrogel was soaked in a 50 mmol/L silver nitrate aqueous solution for 12 h, and the liquid in the wood fiber-based hydrogel was compressed; and the above operations were repeated 5 times to form a conductive phase-loaded wood fiber-based hydrogel.

S4: The conductive phase-loaded wood fiber-based hydrogel reacted with an aqueous solution including a polyelectrolyte monomer, a crosslinker, an initiator and a catalyst at 50° C. for 18 h to form a conductive phase-wood fiber-based hydrogel composite. The polyelectrolyte monomer was a 3.5 mol/L acrylic acid aqueous solution; the crosslinker was MBAA, which was added at an amount that was 0.3% of the mass fraction of the polyelectrolyte monomer; the catalyst was TMEDA, which was added at an amount that was 0.1% of the volume fraction of the aqueous solution; and the initiator was APS, which was added at an amount that was 1.0% of the mass fraction of the polyelectrolyte monomer.

S5: The conductive phase-wood fiber-based hydrogel composite was soaked in a AlCl3 aqueous solution with a concentration of 1.0 mol/L for 15 h of complexation to form the piezoresistive sensor material.

Embodiment 4

The steps and conditions were the same as in Embodiment 1 except that the "1 mol/L AlCl3 aqueous solution" was changed into "1 mol/L FeCl3 aqueous solution". An obtained composite hydrogel exhibited poor performance, whose surface became dense and very hard due to excessive complexation, so that iron ions were unable to further enter the inside of hydrogel. Moreover, the internal hydrogel had a relatively-low strength after the outer shell (about 80 μm in thickness) was peeled off.

Embodiment 5

The steps and conditions were the same as in Embodiment 1 except that the "1 mol/L AlCl3 aqueous solution" was changed into "0.5 mol/L AlCl$_3$ aqueous solution".

Embodiment 6

A piezoresistive sensor was prepared by the following steps:
S1: The piezoresistive sensor material obtained in Embodiment 1 was cut into a sheet with a length of 1 cm, a width of 1 cm and a thickness of 0.5 mm. S2: An electrode-hydrogel dielectric layer-electrode sandwich structure was prepared by using the hydrogel dielectric layer and 50 μm copper electrode sheets, and a copper lead wire with a diameter of 0.1 mm and a length of 6 cm was drawn out on each of the electrode sheets to form a sandwich structure with lead wires. S3: The sandwich structure with lead wires was encapsulated using polyimide film tape (which had a thickness of 40 μm, was coated with silicone on one side, and was insulating and resistant to a high temperature up to 280° C.) to obtain the piezoresistive sensor. The sensor exhibited a sensitivity of 856 MPa$^{-1}$ (under a stress not more than 24 kPa), and as the stress gradually increased to 1.1 MPa, the sensitivity of the sensor was reduced to 7 MPa$^{-1}$.

Embodiment 7

A piezoresistive sensor was prepared by the following steps:
S1: The piezoresistive sensor material obtained in Embodiment 2 was cut into a sheet with a length of 3 cm, a width of 3 cm and a thickness of 3 mm. S2: An electrode-piezoresistive sensor material dielectric layer-electrode sandwich structure was prepared by using the piezoresistive sensor material and 50 μm foamed nickel electrode sheets, and a copper lead wire with a diameter of 0.2 mm and a length of 15 cm was drawn out on each of the electrode sheets to form a sandwich structure with lead wires. S3: The sandwich structure with lead wires was encapsulated using polyimide film tape (which had a thickness of 40 μm, was coated with silicone on one side, and was insulating and resistant to a high temperature up to 280° C.) to obtain the piezoresistive sensor.
The sensor exhibited a sensitivity of 326 MPa$^{-1}$ (under a stress not more than 56 kPa), and as the stress gradually increased to 1.2 MPa, the sensitivity of the sensor was reduced to 3 MPa$^{-1}$.

Embodiment 8

A piezoresistive sensor was prepared by the following steps:
S1: The piezoresistive sensor material obtained in Embodiment 3 was cut into a sheet with a length of 1.5 cm, a width of 1.5 cm and a thickness of 1.5 mm. S2: An electrode-piezoresistive sensor material dielectric layer-electrode sandwich structure was prepared by using the piezoresistive sensor material and 100 μm foamed nickel electrode sheets, and a copper lead wire with a diameter of 0.15 mm and a length of 10 cm was drawn out on each of the electrode sheets to form a sandwich structure with lead wires. S3: The sandwich structure with lead wires was encapsulated using polyimide film tape (which had a thickness of 40 μm, was coated with silicone on one side, and was insulating and resistant to a high temperature up to 280° C.) to obtain the piezoresistive sensor.
The sensor exhibited a sensitivity of 458 MPa$^{-1}$ (under a stress not more than 55 kPa), and as the stress gradually increased to 0.5 MPa, the sensitivity of the sensor was reduced to 38 MPa$^{-1}$.

Embodiment 9

The moisture content and compressive strength of the sensor materials prepared in Embodiments 1 to 5 were shown in Table 1:

TABLE 1

|  | Moisture content | Compressive strength (MPa) (60% deformation) |
|---|---|---|
| Embodiment 1 | 82% | >0.5 |
| Embodiment 2 | 86% | >1.2 |
| Embodiment 3 | 89% | >1.5 |
| Embodiment 4 | 78% | >0.09 |
| Embodiment 5 | 86% | >0.8 |

Finally, it should be noted that the foregoing embodiments are provided merely for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof; and these modifications or replacements do not make the essence of the corresponding technical solution depart from the scope of the technical solutions of the embodiments of the present disclosure, and shall fall within the scope of claims and specification of the present disclosure.

What is claimed is:
1. A method for preparing a piezoresistive sensor material, comprising:
a first step of treating a wood powder with an ionic liquid, and subjecting a resulting wood powder to solation, chemical crosslinking-gelation, and lyophilization to obtain a wood fiber aerogel;
a second step of soaking the aerogel in an alkaline buffer of dopamine hydrochloride to conduct self-polymerization on the surface of the aerogel for 10 hours to 14 hours to obtain a wood fiber-based hydrogel deposited with polydopamine;
a third step of soaking the wood fiber-based hydrogel in a nano conductive phase suspension or a nano conductive phase precursor for 10 hours to 24 hours, and compressing the liquid in the wood fiber-based hydrogel, and repeating the step operations 3 to 5 times to form a conductive phase-loaded wood fiber-based hydrogel;
a fourth step of subjecting the conductive phase-loaded wood fiber-based hydrogel to reaction with an aqueous solution comprising a polyelectrolyte monomer, a crosslinker, an initiator and a catalyst at 40° C. to 60° C. for 12 hours to 24 hours to form a conductive phase-wood fiber-based hydrogel composite; and a fifth step of soaking the conductive phase-wood fiber-based hydrogel composite in an aqueous solution of a metal ionic compound for 6 hours to 24 hours of complexation to form the piezoresistive sensor material.

2. The method for preparing a piezoresistive sensor material according to claim 1, wherein the first step further comprises:
adding the wood powder to an ionic liquid of 1-Ethyl-3-methylimidazolium acetate ([EMIM][Ac]) at an amount that is 4% to 6% of the mass fraction of the ionic liquid, and heating and stirring a resulting mixture at 110° C. to 185° C. for 30 min to 24 hours to form a suspension; transferring the above suspension into an acetone aqueous solution with a volume 8 to 10 times that of the suspension and a concentration of 40% to 60% (v/v), and stirring a resulting mixture for 1 hours to 3 hours, subjecting the mixture to suction filtration to obtain a filter cake, and washing the filter cake, and drying the filter cake at 100° C. to 110° C. to obtain a wood fiber;
adding the wood fiber to an aqueous solution comprising 4 wt NaOH and 4 wt % urea to form a suspension, freezing the suspension at −40° C. to −20° C. for 3 hours to 9 hours and thawing at room temperature, and repeating the freezing and thawing treatment 3 to 5 times to obtain a solated wood fiber, wherein the wood fiber and the aqueous solution are mixed at a mass ratio of (0.8-1.5):100;
adding epichlorohydrin (ECH) to the solated wood fiber at a mass 8 to 20 times that of the solated wood fiber, heating and reacting at 40° C. to 60° C. for 1 hours to 6 hours, and washing with water to obtain a chemical crosslinking-gelled wood fiber;
adding 100 mL to 500 mL of a 30% to 90% (v/v) ethanol aqueous solution to the chemical crosslinking-gelled wood fiber, standing for 10 h to 16 h, washing with water, and lyophilizing to obtain a wood fiber aerogel with a density of 0.016 g cm$^{-3}$ to 0.025 g cm$^{-3}$.

3. The method for preparing a piezoresistive sensor material according to claim 1, wherein, the second step further comprises soaking the aerogel in an alkaline tris-hydroxymethylaminomethane-hydrochloric acid buffer of dopamine hydrochloride to obtain the wood fiber-based hydrogel deposited with polydopamine, further wherein the buffer has a dopamine hydrochloride concentration of 1 mg/mL to 3 mg/mL, a tris-hydroxymethylaminomethane concentration of 0.01 mol/L to 0.1 mol/L, and a pH of 8 to 10.5.

4. The method for preparing a piezoresistive sensor material according to claim 1, further wherein, in the third step, the nano conductive phase suspension is a reduced graphene oxide (rGO) suspension, wherein the rGO suspension is prepared by the following steps:
adding 2 g of graphite powder to 45 mL of concentrated sulfuric acid with a mass fraction of 98% under a 0° C. ice water bath and mechanical stirring, and adding 10 g of potassium permanganate at a rate of about 0.5 g/min to form a suspension;
transferring the above suspension to a 35° C. water bath, and stirring vigorously for 24 h; heating to 90° C., and adding 250 mL of deionized water; stirring a resulting mixture vigorously for 30 min, and cooling to room temperature; adding 10 mL of a 30% (v/v) $H_2O_2$ aqueous solution, and thoroughly stirring a resulting mixture; centrifuging the resulting mixture at 10,000 rpm for 15 min, and removing a resulting supernatant; and washing a resulting precipitate with deionized water, and repeating the centrifuging and washing operations 5 times to obtain a graphene oxide (GO) concentrate;
diluting a portion of the GO concentrate to 20 mL with a concentration of 5 mg/mL, and adding 20 mL of 55% (v/v) HI aqueous solution, conducting reduction at room temperature for 6 hours, and conducting dialysis for one week to obtain an rGO suspension precursor; and
adjusting the concentration of rGO to 0.05 mg/mL, 0.1 mg/mL and 0.2 mg/mL, separately, and subjecting resulting solutions to ultrasonication for 15 min to obtain rGO suspensions with three different concentrations.

5. The method for preparing a piezoresistive sensor material according to claim 1, further wherein, in the third step, the nano conductive phase precursor is a 25 mmol/L to 100 mmol/L silver nitrate aqueous solution.

6. The method for preparing a piezoresistive sensor material according to claim 1, further wherein, in the fourth step, the polyelectrolyte monomer is a 2.8 mol/L to 3.5 mol/L acrylic acid aqueous solution; the crosslinker is N,N'-methylenebisacrylamide (MBAA), which is added at an amount that is 0.1% to 0.5% of the mass fraction of the polyelectrolyte monomer, the catalyst is tetramethylethylenediamine (TMEDA), added at an amount that is 0.05% to 0.15% of the volume fraction of the aqueous solution, and the initiator is a persulfate comprising ammonium persulfate (APS), added at an amount that is 0.5% to 1.5% of the mass fraction of the polyelectrolyte monomer.

7. The method for preparing a piezoresistive sensor material according to claim 1, wherein, in the fifth step, the metal ion aqueous solution is an $AlCl_3$ or $FeCl_3$ aqueous solution with a concentration of 0.2 mol/L to 1.0 mol/L.

8. Use of the piezoresistive sensor material produced by the methods of claim 1 in the preparation of a piezoresistive sensor.

9. Use of the piezoresistive sensor material produced by the methods of claim 2 in the preparation of a piezoresistive sensor.

10. Use of the piezoresistive sensor material produced by the methods of claim 3 in the preparation of a piezoresistive sensor.

11. Use of the piezoresistive sensor material produced by the methods of claim 4 in the preparation of a piezoresistive sensor.

12. Use of the piezoresistive sensor material produced by the methods of claim 5 in the preparation of a piezoresistive sensor.

13. Use of the piezoresistive sensor material produced by the methods of claim 6 in the preparation of a piezoresistive sensor.

14. Use of the piezoresistive sensor material produced by the methods of claim 7 in the preparation of a piezoresistive sensor.

15. A piezoresistive sensor produced by the methods of claim 1, wherein the method further comprises the steps of:
cutting the piezoresistive sensor material into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;
preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

16. A piezoresistive sensor produced by the method of claim 2, wherein the method further comprises the steps of:

cutting the piezoresistive sensor material according into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

17. A piezoresistive sensor produced by the method of claim 3, wherein the method further comprises the steps of:

cutting the piezoresistive sensor material into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

preparing an electrode hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

18. A piezoresistive sensor produced by the method of claim 4, wherein the method further comprises the steps of:

cutting the piezoresistive sensor material according into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

19. A piezoresistive sensor produced by the method of claim 5, wherein the method further comprises the steps of:

cutting the piezoresistive sensor material into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

20. A piezoresistive sensor produced by the method of claim 6, wherein the method further comprises the steps of:

cutting the piezoresistive sensor material into a suitable size to obtain a hydrogel dielectric layer, comprising a sheet with a length of 1 cm to 3 cm, a width of 1 cm to 3 cm, and a thickness of 0.5 mm to 3 mm, or a sheet with a diameter of 1 cm to 3 cm and a thickness of 0.5 mm to 3 mm;

preparing an electrode-hydrogel dielectric layer-electrode sandwich structure by using the hydrogel dielectric layer and electrode sheets, and drawing out a copper or silver wire with a diameter of 0.1 mm to 0.2 mm and a length of 6 cm to 15 cm as a lead wire on each of the electrode sheets to form a sandwich structure with lead wires; and encapsulating the sandwich structure with lead wires using polyimide film tape to obtain a piezoresistive sensor.

\* \* \* \* \*